US006794083B2

(12) United States Patent
Schmidt et al.

(10) Patent No.: US 6,794,083 B2
(45) Date of Patent: Sep. 21, 2004

(54) FLUOROALKYLPHOSPHATE SALT ELECTROLYTES

(75) Inventors: Michael Schmidt, Seeheim-Jugenheim (DE); Frank Ott, Griesheim (DE); Michael Jungnitz, Langen (DE); Nikolai Ignatyev, Duisburg (DE); Andreas Kuehner, Darmstadt (DE)

(73) Assignee: Merck Patent Gesellschaft mit beschränkter Haftung, Darmstadt (DE)

( * ) Notice: Subject to any disclaimer, the term of this patent is extended or adjusted under 35 U.S.C. 154(b) by 171 days.

(21) Appl. No.: 09/986,773

(22) Filed: Nov. 9, 2001

(65) Prior Publication Data

US 2002/0114996 A1 Aug. 22, 2002

(30) Foreign Application Priority Data

Nov. 10, 2000 (DE) .......................... 100 55 812
Nov. 23, 2000 (DE) .......................... 100 58 264

(51) Int. Cl.[7] ............................................ H01M 10/08
(52) U.S. Cl. ..................... 429/188; 429/305; 429/307; 429/322; 429/203; 252/62.2; 423/301; 423/323
(58) Field of Search ................... 429/307, 188, 429/203, 305, 322; 252/62.2; 423/301, 323

(56) References Cited

U.S. PATENT DOCUMENTS

| 5,326,657 | A  | * | 7/1994  | Suga ........................... 429/192 |
| 6,210,830 | B1 | * | 4/2001  | Sartori ........................ 429/199 |
| 6,268,087 | B1 | * | 7/2001  | Kim ....................... 429/231.95 |
| 6,423,454 | B1 | * | 7/2002  | Heider ........................ 429/345 |
| 2001/0033964 | A1 |  | 10/2001 | Heider et al. |
| 2001/0046628 | A1 |  | 11/2001 | Oesten et al. |
| 2002/0009640 | A1 |  | 1/2002  | Heider et al. |
| 2002/0015883 | A1 |  | 2/2002  | Hilarius et al. |
| 2002/0015884 | A1 |  | 2/2002  | Schmidt et al. |
| 2002/0028381 | A1 |  | 3/2002  | Heider et al. |

FOREIGN PATENT DOCUMENTS

| CA | 2317284 A1 | 3/2001 |
| CA | 2321373 A1 | 3/2001 |
| DE | 19641138 A1 | 9/1998 |
| DE | 19922522 A1 | 11/2000 |
| DE | 19946066 A1 | 3/2001 |
| DE | 10016024 A1 | 4/2001 |
| DE | 10042149 A1 | 5/2001 |
| DE | 19953051 A1 | 5/2001 |
| DE | 19941566 A1 | 8/2001 |
| WO | WO 98/15562 | * 4/1998 .......... H01M/10/08 |

OTHER PUBLICATIONS

Jander et al, Formation of trifluromethyllated fluro phosphates by reaction of trimethyltriflouromethyltin with phosphorus (v) fluoride. In:Justus Liebigs Ann. Chem. 1969, 726, S. 19–24, An 71:81483 CA, Abstract.

Chan et al, Trifluoromethyl–substituted fluorophosphates and fluoroarsenates. In: Can. J. Chem. 1968, 46 (8), S. 1237–1248, AN 68:114717 CA, Abstract.

Pavlenko et al. Reaction of tris (perluoroalkyl) phosphine oxides and tris (perluoroalky) difluorophosphoranes with fluoride ion. In: Zh. Obshch. Khim. 1989, 59 (3) S. 528–534, AN 111:174247 CA, Abstract.

\* cited by examiner

*Primary Examiner*—Mark Ruthkosky
(74) *Attorney, Agent, or Firm*—Millen, White, Zelano & Branigan, P.C.

(57) ABSTRACT

The present invention relates to mixtures of fluoroalkylphosphate salts and polymers, methods of producing same, and their use in electrolytes, batteries, capacitors, supercapacitors and galvanic cells.

33 Claims, No Drawings

FLUOROALKYLPHOSPHATE SALT ELECTROLYTES

The present invention relates to mixtures of fluoroalkylphosphate salts and polymers, methods of producing same, and their use in electrolytes, batteries, capacitors, supercapacitors and galvanic cells.

In recent years, the spreading of portable electronic devices such as laptop and palmtop computers, cell telephones, or video cameras and thus, the demand for light-weight and high-performance batteries has dramatically increased worldwide.

In view of such rapidly increasing demand for batteries and the associated ecological problems, the development of rechargeable batteries having long service life and high performance has become more and more important.

More specifically, the quality of the electrolyte has an enormous effect on the service life and performance of the batteries, and the past therefore has seen numerous attempts of continuously improving the electrolyte.

Conventionally, the well-known electrolyte systems have been divided in liquid and solid electrolytes, and solid electrolytes comprise both polymer electrolytes and gel or hybrid electrolytes.

Battery cells based on liquid electrolytes generally have relatively good ionic conductivities, but are liable to leakage, giving rise to liberation of liquids which represent a potential hazard to man and environment. In addition, the production of such battery cells is restricted with respect to feasible sizes and shapes of these cells.

Polymer electrolytes normally are based on an optionally crosslinked polymer and a conducting salt. However, conventional polymer electrolytes frequently have low ionic conductivities which do not comply with the high demands to be met by modern batteries.

Gel or hybrid electrolytes are understood to be electrolyte systems including a solvent in addition to an optionally crosslinked polymer and a conducting salt. These polymers frequently are crosslinked at relatively high temperatures in the presence of the conducting salts. For this reason, appropriate conducting salts must have a relatively high thermal stability in solution because otherwise, they might undergo decomposition and in consequence, the ionic conductivity of the resulting gel electrolyte might be reduced.

DE 196 41 138 discloses lithium fluorophosphates having preferably per-fluorinated or partially fluorinated ethyl and isopropyl groups and their use as conducting salts in batteries. Use of these salts as conducting salts in polymer electrolytes has not been described. The German patent application, file number 100 08 955, describes lithium fluoroalkylphosphates and their use as conducting salts in batteries, capacitors, supercapacitors, and galvanic cells. There is no disclosure as to polymer electrolytes based on these salts.

The basic object of the present invention is to provide electrolytes which, in addition to high ionic conductivity, would have high thermal and electrochemical stability.

Another object of the present invention is to improve the service life and enhance the performance of batteries, capacitors, supercapacitors, and galvanic cells.

Surprisingly, these objects have been accomplished by providing mixtures including a) at least one fluoroalkylphosphate salt of general formula (I)

$$M^{n+}([PF_x(C_yF_{2y+1-z}H_z)_{6-x}]^-)_n \qquad (I)$$

wherein
$M^{n+}$ is a univalent, bivalent, or trivalent cation,
$1 \leq x \leq 5$,
$1 \leq y \leq 8$, and
$0 \leq z \leq 2y+1$, n=1, 2 or 3, and the ligands $(C_yF_{2y+1-z}H_z)$ each are the same or different, and b) at least one polymer.

Mixtures in the meaning of the present invention include pure mixtures of components a) and b), mixtures wherein the salt of component a) is included in the polymer of component b), and mixtures wherein chemical and/or physical bonds exist between the salt of component a) and the polymer of component b).

Conventionally, corresponding mixtures comprised of at least one conducting salt and at least one polymer are also referred to as polymer electrolytes.

The mixtures according to the invention may also include two or more fluoroalkylphosphate salts of general formula (I) as component a) and/or two or more polymers of component b) at a time. Preferably, the mixtures of the invention each include a fluoroalkylphosphate salt of general formula (I) as component a) and a polymer of component b), because particularly good reproducibility of the electrochemical properties can be achieved in this way.

The mixture according to the invention preferably includes fluoroalkylphosphate salts of general formula (I) as component a), wherein $M^{n+}$ is a lithium cation, a sodium cation, a potassium cation, a rubidium cation, a cesium cation, a magnesium cation, or an aluminum cation. In a particularly preferred fashion, the mixture of the invention includes those salts as component a) wherein $M^{n+}$ represents a lithium cation.

Likewise, the mixture according to the invention preferably includes fluoroalkylphosphate salts of general formula (I) wherein $M^{n+}$ represents an organic cation. Preferably, the organic cation a nitrosyl cation, a nitryl cation, a tropylium cation, or a cation of general formula $[NR_4]^+$, $[P(NR_2)_k R_{4-k}]^+$, with $0 \leq k \leq 4$, $[C(NR_2)_3]^+$, or $[CR_3]^+$, wherein each of the substituents R, same or different, represents H,
$C_oF_{2o+1-p-q}H_pA_q$, or
A, wherein $1 \leq o \leq 10$, $0 \leq p \leq 2o+1$, $0 \leq q \leq 2o+1$, preferably $1 \leq o \leq 6$, $0 \leq p \leq 2o+1$, $0 \leq q \leq 2o+1$, and A represents an aromatic residue optionally having hetero-atoms, or a preferably 5- or 6-membered cycloalkyl residue. The ligands $C_oF_{2o+1-p-q}H_pA_q$ may also be at least partially substituted by chlorine and/or bromine, and the residues A may also be at least partially substituted by fluorine, chlorine and/or bromine.

All of the aromatic, heteroaromatic or cycloaliphatic compounds well-known to those skilled in the art and suitable in the preparation of $[NR_4]^+$, $[P(NR_2)_k R_{4-k}]^{30}$, with $0 \leq k \leq 4$, $[C(NR_2)_3]^+$, or $[CR_3]^+$ cations can be used as aromatic or cycloaliphatic residue A optionally including heteroatoms.

Preferably, A represents a 5- or 6-membered aromatic or cycloaliphatic residue optionally including nitrogen and/or sulfur and/or oxygen atoms, more preferably a phenyl or pyridine residue.

As component a), the mixtures according to the invention more preferably include fluoroalkylphosphate salts of general formula (I) having perfluorinated ligands, i.e., salts having ligands wherein $1 \leq x \leq 5$, $1 \leq y \leq 8$, and z=0.

In a particularly preferred embodiment of the present invention, the mixtures of the invention include one or more fluoroalkylphosphate salts as component a), which are selected from the group consisting of:

Li$^+$[F$_{6-x}$P(CF$_2$CF$_3$)$_x$]$^-$, with 1≦x≦3,
Li$^+$[F$_{6-x}$P(CF$_2$CF$_2$CF$_3$)$_x$]$^-$, with 1≦x≦3,
Li$^+$[F$_{6-x}$P(CF$_2$CF$_2$CF$_2$CF$_3$)$_x$]$^-$, with 1≦x≦3,
Li$^+$[F$_{6-x}$P(CF(CF$_3$)$_2$)$_x$]$^-$, with x=1 or 2,
[N(C$_2$H$_5$)$_4$][PF$_3$(C$_2$F$_5$)$_3$],
[N(CH$_3$)$_4$][PF$_3$(C$_4$F$_9$)$_3$],
[P(N(CH$_3$)$_2$)$_4$][PF$_3$(C$_2$F$_5$)$_3$],
[P(N(CH$_3$)$_2$)$_4$][PF$_3$(C$_4$F$_9$)$_3$],
[P(CH$_3$)$_4$][PF$_3$(C$_2$F$_5$)$_3$],
[P(C$_2$H$_5$)$_4$][PF$_3$(C$_2$F$_5$)$_3$],
[P(CH$_3$)$_4$][PF$_3$(C$_4$F$_9$)$_3$],
[P(C$_2$H$_5$)$_4$][PF$_3$(C$_4$F$_9$)$_3$],
[C(N(CH$_3$)$_2$)$_3$][PF$_3$(C$_2$F$_5$)$_3$], and
[C(N(CH$_3$)$_2$)$_3$][PF$_3$(C$_4$F$_9$)$_3$].

The fluoroalkylphosphate salts of general formula (I) can be obtained using methods according to which at least one compound of general formula (II) to (VII)

H$_r$P(C$_s$H$_{2s+1}$)$_{3-r}$(II),
OP(C$_s$H$_{2s+1}$)$_3$(III),
Cl$_r$P(C$_s$H$_{2s+1}$)$_{3-r}$(IV),
F$_r$P(C$_s$H$_{2s+1}$)$_{3-r}$(V),
Cl$_r$P(C$_s$H$_{2s+1}$)$_{5-t}$(VI), and/or
F$_r$P(C$_s$H$_{2s+1}$)$_{5-t}$(VII), wherein 0≦r≦2,
3≦s≦8, and
0≦t≦4, is fluorinated by electrolysis in hydrogen fluoride, the mixture of fluorination products thus obtained is separated, and the fluorinated alkylphosphorane thus obtained is reacted in an aprotic solvent or solvent mixture under exclusion of moisture with a compound of general formula (VIII)

$$M^{n+}(F^-)_n \qquad (VIII),$$

wherein M$^{n+}$ and n have the meanings as mentioned above. If necessary, the fluoroalkylphosphate salt of general formula (I) thus obtained can be purified and isolated according to conventional methods well-known to those skilled in the art.

Preferably, the electrolysis is performed at a temperature of from −20 to +40° C., more preferably from −10 to +10° C., and from −5 to +5° C. being particularly preferred. Preferably, the pressure is from 0.5 to 3 bars, more preferably from 0.5 to 1.5 bars, with normal pressure being particularly preferred.

The voltage applied during electrolysis preferably is from 4 to 6 V, more preferably from 4.5 to 5.5 V, the current density is from 0.2 to 5 A/dm$^2$, more preferably from 0.2 to 2 A/dm$^2$, and from 0.5 to 1.5 A/dm$^2$ being particularly preferred.

Prior to electrolysis in hydrogen fluoride, the compounds of general formula (IV) and/or (VI) may also be reacted with inorganic fluorination agents, preferably with SbF$_3$, SbF$_5$, MoF$_5$, VF$_5$, or mixtures of at least two of these fluorination agents, thereby replacing the chlorine atoms by fluorine atoms. The reaction conditions used to perform such fluorinations are well-known to those skilled in the art.

Preferably, the reaction of the fluorinated alkylphosphoranes with a compound of general formula (VIII) is carried out at a temperature of from −35 to 60° C., more preferably from −20 to 50° C., and from −10 to 25° C. being particularly preferred.

Preferably, carbonates, nitrites, ethers, esters, amides, sulfones, or mixtures of at least two of these solvents are used as solvents in the reaction of the fluorinated alkylphosphoranes with a compound of general formula (VIII).

As component b), the mixture according to the invention preferably includes a homopolymer or copolymer of unsaturated nitriles, preferably acrylonitrile, vinylidenes, preferably vinylidene difluoride, acrylates, preferably methyl acrylate, methacrylates, preferably methyl methacrylate, cyclic ethers, preferably tetrahydrofuran, alkylene oxides, preferably ethylene oxide, siloxane, phosphazene, alkoxysilanes, or an organically modified ceramic, or a mixture of at least two of the above-mentioned homopolymers and/or copolymers and optionally at least one organically modified ceramic.

Preferably, inorganic-organic hybrid polymers are possible as organically modified ceramics, which polymers are obtained by hydrolysis and fusion of organically modified silicon alkoxides and subsequent crosslinking of the crosslinkable groups fixed on the inorganic backbone. For example, appropriate organically modified ceramics are being marketed under the name of ORMOCERE®.

In a preferred embodiment, the mixture according to the invention includes a homopolymer or copolymer of vinylidene difluoride, acrylonitrile, methyl (meth)acrylate, and tetrahydrofuran as component b). In a particularly preferred embodiment, a homopolymer or copolymer based on vinylidene difluoride is present as component b) polymer.

For example, these homo- and copolymers of vinylidene difluoride are being marketed under the names of Kynar® and Kynarflex® by Atofina Chemicals, Inc., and under the name of Solef® by the Solvay Company.

The polymers used according to the invention may also be at least partially crosslinked. Crosslinking can be effected according to conventional methods well-known to those skilled in the art, using well-known crosslinking agents. Crosslinking may also be effected in the presence of component a) and optionally additional components.

In a preferred embodiment of the present invention, the mixture includes from 5 to 99 wt.-% of component a) and from 95 to 1 wt.-% of component b), more preferably from 60 to 99 wt.-% of component a) and from 40 to 1 wt.-% of component b), each time relative to the sum of components a) and b).

In addition to the fluoroalkylphosphate salts of general formula (I) and the polymers, the mixture according to the invention may include a solvent or a mixture of solvents comprised of two or more solvents. Conventionally, such mixtures comprised of a conducting salt, a polymer and at least one solvent are also referred to as gel electrolytes.

Preferred solvents are organic carbonates, preferably ethylene carbonate, propylene carbonate, butylene carbonate, dimethyl carbonate, diethyl carbonate, ethyl methyl carbonate, or methyl propyl carbonate, organic esters, preferably methyl formate, ethyl formate, methyl acetate, ethyl acetate, methyl propionate, ethyl propionate, methyl butyrate, ethyl butyrate, γ-butyrolactone, organic ethers, preferably diethyl ether, dimethoxyethane, diethoxyethane, organic amides, preferably dimethylformamide or dimethylacetamide, sulfur-containing solvents, preferably dimethylsulfoxide, dimethyl sulfite, diethyl sulfite, or propanesultone, aprotic solvents, preferably acetonitrile, acrylonitrile, or acetone, or at least partially fluorinated derivatives of the above-mentioned solvents, or mixtures of at least two of these solvents and/or fluorinated derivatives of these solvents.

The present invention also is directed to a method of producing the mixtures of the invention, according to which at least one of the above-mentioned fluoroalkylphosphate salts of general formula (I) and at least one polymer and optionally at least one solvent are mixed together.

Preferably, the above components are mixed at elevated temperature, preferably at 20 to 90° C., more preferably at 40 to 60° C., and these temperatures may vary depending on the components employed.

The present invention is also directed to the use of at least one mixture of the invention in electrolytes, primary batteries, secondary batteries, capacitors, supercapacitors, and/or galvanic cells, optionally in combination with other well-known conducting salts and/or additives.

The invention is also directed to electrolytes, primary and secondary batteries, capacitors, supercapacitors, and galvanic cells including at least one mixture of the invention and optionally other conducting salts and/or additives. Other conducting salts and additives are known to those skilled in the art, e.g. from Doron Auerbach, Nonaqueous Electrochemistry, Marc Dekker Inc., New York, 1999; D. Linden, Handbook of Batteries, Second Edition, McGraw-Hill Inc., New York, 1995; as well as G. Mamantov and A. I. Popov, Chemistry of Nonaqueous Solutions, Current Progress, VCH Verlagsgesellschaft, Weinheim, 1994. These citations are hereby incorporated by reference and are deemed to be part of the disclosure.

Likewise, the mixtures of the invention may include the fluoroalkylphosphate salts of general formula (I) in amounts of between 1 and 99 wt.-%, in combination with other conducting salts that find use in electrochemical cells. For example, conducting salts selected from the group of $LiPF_6$, $LiBF_4$, $LiClO_4$, $LiAsF_6$, $LiCF_3SO_3$, $LiN(CF_3SO_2)_2$, $LiC(CF_3SO_2)_3$, $LiN(SO_2C_2F_5)_2$, and $Li[B(O_4C_2)_2]$, and mixtures of at least two of these compounds are suitable.

In addition to the mixtures of the invention, these electrolytes may also include organic isocyanates (DE 199 44 603) to reduce the water content.

Compounds of general formula

wherein

Kt represents N, P, As, Sb, S, Se,

A represents N, P, P(O), O, S, S(O), $SO_2$, As, As(O), Sb, Sb(O), $R^1$, $R^2$ and $R^3$, same or different, represent H, halogen, substituted and/or unsubstituted alkyl $C_nH_{2n+1}$, substituted and/or unsubstituted alkenyl having 1–18 carbon atoms and one or more double bonds, substituted and/or unsubstituted alkynyl having 1–18 carbon atoms and one or more triple bonds, substituted and/or unsubstituted cycloalkyl $C_mH_{2m+1}$, mono- or polysubstituted and/or unsubstituted phenyl, substituted and/or unsubstituted heteroaryl, A may be included at different positions in $R^1$, $R^2$ and/or $R^3$, Kt may be included in cyclic or heterocyclic rings; the groups bound to Kt may be the same or different, with

| n | 1–18, |
| m | 3–7, |
| k | 0, 1–6, |
| l | 1 or 2 if x = 1, and 1 if x = 0, |
| x | 0,1, |
| y | 1–4, | may also be included (DE 99 41 566). The method of preparing these compounds is characterized in that an alkali salt of general formula

with $D^+$ selected from the group of alkali metals, is reacted in a polar organic solvent with a salt of general formula

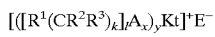

wherein

Kt, A, $R^1$, $R^2$, $R^3$, k, l, x, and y have the above-stated meanings, and $E^-$ represents $F^-$, $Cl^-$, $Br^-$, $I^-$, $BF_4^-$, $ClO_4^-$, $AsF_6^-$, $SbF_6^-$, or $PF_6^-$.

The mixtures according to the invention may also be included in electrolytes comprising compounds of formula

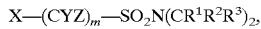

with

| X | H, F, Cl, $C_nF_{2n+1}$, $C_nF_{2n-1}$, $(SO_2)_kN(CR^1R^2R^3)_2$, |
| Y | H, F, Cl, |
| Z | H, F, Cl |
| $R^1$, $R^2$, $R^3$ | H and/or alkyl, fluoroalkyl, cycloalkyl, |
| m | 0–9, and if X = H, m ≠ 0, |
| n | 1–9, |
| k | 0 if m = 0, and k = 1 if m = 1–9, | prepared by reacting partially fluorinated or perfluorinated alkylsulfonyl fluorides with dimethylamine in organic solvents (DE 199 46 673).

Lithium complex salts of formula

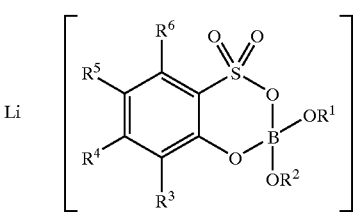

wherein $R^1$ and $R^2$ are the same or different, optionally bound directly to each other by a single or double bond, each one alone or together representing an aromatic ring from the group of phenyl, naphthyl, anthracyl or phenanthryl, which may be unsubstituted or from mono- to hexasubstituted by alkyl ($C_1$–$C_6$), alkoxy groups ($C_1$–$C_6$), or halogen (F, Cl, Br), or each one alone or together representing an aromatic heterocyclic ring from the group of pyridyl, pyrazyl or pyrimidyl, which may be unsubstituted or from mono- to tetrasubstituted by alkyl ($C_1$–$C_6$), alkoxy groups ($C_1$–$C_6$), or halogen (F, Cl, Br), or each one alone or together representing an aromatic ring from the group of hydroxybenzenecarboxyl, hydroxynaphthalenecarboxyl, hydroxybenzenesulfonyl, and hydroxynaphthalenesulfonyl, which may be unsubstituted or from mono- to tetrasubstituted by alkyl ($C_1$–$C_6$), alkoxy groups ($C_1$–$C_6$), or halogen (F, Cl, Br), $R^3$ to $R^6$, each one alone or in pairs, optionally bound directly to each other by a single or double bond, may represent the following:
1. alkyl ($C_1$–$C_6$), alkoxy ($C_1$–$C_6$), or halogen (F, Cl, Br),
2. an aromatic ring from the groups of phenyl, naphthyl, anthracyl, or phenanthryl, which may be unsubstituted or from mono- to hexasubstituted by alkyl ($C_1$–$C_6$), alkoxy groups ($C_1$–$C_6$), or halogen (F, Cl, Br), pyridyl, pyrazyl or pyrimidyl, which may be unsubstituted or from mono- to tetrasubstituted by alkyl ($C_1$–$C_6$), alkoxy groups ($C_1$–$C_6$), or halogen (F, Cl, Br), prepared using the following method (DE 199 32 317)
    a) 3-, 4-, 5-, 6-substituted phenol in a suitable solvent is added with chlorosulfonic acid,
    b) the intermediate from a) is reacted with chlorotrimethylsilane, filtrated and subjected to fractionated distillation,
    c) the intermediate from b) is reacted with lithium borate tetramethanolate in a suitable solvent, and the final product is isolated therefrom, may also be included in the electrolyte.

Electrolytes having complex salts of general formula (DE 199 51 804)

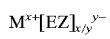

$$M^{x+}[EZ]_{k/y}^{y-}$$

wherein
x, y represent 1, 2, 3, 4, 5, 6, $M^{x+}$ represents a metal ion, E represents a Lewis acid selected from the group of $BR^1R^2R^3$, $AlR^1R^2R^3$, $PR^1R^2R^3R^4R^5$, $AsR^1R^2R^3R^4R^5$, $VR^1R^2R^3R^4R^5$, $R^1$ to $R^5$, same or different, optionally bound directly to each other by a single or double bond, each one alone or together may represent a halogen (F, Cl, Br), an alkyl or alkoxy residue ($C_1$–$C_6$) which may be partially or completely substituted by F, Cl, Br, an aromatic ring from the group of phenyl, naphthyl, anthracyl, or phenanthryl, optionally bound via oxygen, which may be unsubstituted or from mono- to tetrasubstituted by alkyl ($C_1$–$C_6$) or F, Cl, Br, an aromatic heterocyclic ring from the group of pyridyl, pyrazyl or pyrimidyl, optionally bound via oxygen, which may be unsubstituted or from mono- to tetrasubstituted by alkyl ($C_1$–$C_8$) or F, Cl, Br, and Z represents $OR^6$, $NR^6R^7$, $CR^6R^7R^8$, $OSO_2R^6$, $N(SO_2R^6)(SO_2R^7)$, $C(SO_2R^6)(SO_2R^7)(SO_2R^8)$, $OCOR^6$, wherein
$R^6$ to $R^8$ are the same or different, optionally bound directly to each other by a single or double bond, each one alone or together representing hydrogen or having the meaning like $R^1$ to $R^5$, prepared by reacting an appropriate boron or phosphorus/Lewis acid/solvent adduct with a lithium or tetraalkylammonium imide, methanide or triflate, can also be used.

Borate salts (DE 199 59 722) of general formula

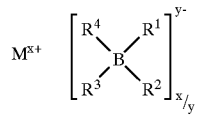

wherein
M represents a metal ion or a tetraalkylammonium ion, x, y represent 1, 2, 3, 4, 5, or 6, $R^1$ to $R4^4$, same or different, represent alkoxy or carboxy residues ($C_1$–$C_8$) optionally bound directly to each other by a single or double bond, may also be included.

These borate salts are prepared by reacting lithium borate tetraalcoholate or a 1:1 mixture of lithium alcoholate and a boric acid ester in an aprotic solvent with a suitable hydroxy or carboxy compound at a ratio of 2:1 or 4:1.

Additives such as silane compounds of general formula

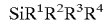

$$SiR^1R^2R^3R^4$$

with $R^1$ to $R^4$ H,
$C_yF_{2y+1-z}H_z$,
$OC_yF_{2y+1-z}H_z$,
$OC(O)C_yF_{2y+1-z}H_z$,
$OSO_2C_yF_{2y+1-z}H_z$,
and
$1 \leq x \leq 6$,
$1 \leq y \leq 8$, and
$0 \leq z \leq 2y+1$,
and
$R^1$–$R^4$, same or different, representing an aromatic ring from the group of phenyl, naphthyl, which may be unsubstituted or mono- or polysubstituted by F, $C_yF_{2y+1-z}H_z$ or $OC_yF_{2y+1-z}H_z$, $OC(O)C_yF_{2y+1-z}H_z$, $OSO_2C_yF_{2y+1-z}H_z$, $N(C_nF_{2n+1-z}H_z)_2$, or representing a heterocyclic aromatic ring from the group of pyridyl, pyrazyl or pyrimidyl, each of which may be substituted by F, $C_yF_{2y+1-z}H_z$ or $OC_yF_{2y+1-z}H_z$, $OC(O)C_yF_{2y+1-z}H_z$, $OSO_2C_yF_{2y+1-z}H_z$, $N(C_nF_{2n+1-z}H_z)_2$ (DE 100 27 626), may also be included.

The mixtures according to the invention may also be used in electrolytes including salts of formula

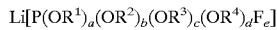

$$Li[P(OR^1)_a(OR^2)_b(OR^3)_c(OR^4)_dF_e]$$

wherein
$0 \leq a+b+c+d \leq 5$, and $a+b+c+d+e=6$, and $R^1$ to $R^4$ independently are alkyl, aryl or heteroaryl residues, and at least two of $R^1$ to $R^4$ may be bound directly to each other by a single or double bond (DE 100 16 801). These compounds are prepared by reacting phosphorus (V) compounds of general formula

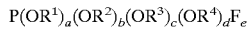

$$P(OR^1)_a(OR^2)_b(OR^3)_c(OR^4)_dF_e$$

wherein
$0 \leq a+b+c+d \leq 5$, and $a+b+c+d+e=5$, and $R^1$ to $R^4$ have the above-stated meanings, with lithium fluoride in the presence of an organic solvent.

Ionic liquids of general formula

$$K^+A^-$$

wherein
$K^+$ represents a cation selected from the group of

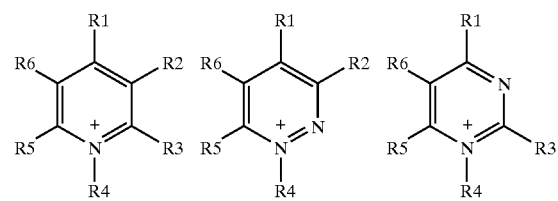

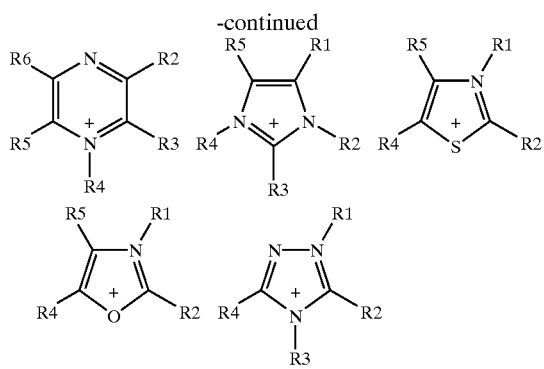

wherein

R¹ to R⁵ are the same or different, optionally bound directly to each other by a single or double bond, each one alone or together representing the following:

H, halogen, alkyl residue ($C_1$–$C_8$) which may be partially or completely substituted by F, Cl, $N(C_nF_{(2n+1-x)}H_x)_2$, $O(C_nF_{(2n+1-x)}H_x)$, $SO_2(C_nF_{(2n+1-x)}H_x)$, $C_nF_{(2n+1-x)}H_x$, with $1<n<6$, and $0<x\leq13$, and $A^-$ represents an anion selected from the group of $$[B(OR^1)_n(OR^2)_m(OR^3)_o(OR^4)_p]^-$$

with $0\leq n, m, o, p \leq 4$, and $m+n+o+p=4$, wherein

R¹ to R⁴ are different, or pairs thereof are the same, optionally bound directly to each other by a single or double bond, each one alone or together representing an aromatic ring from the group of phenyl, naphthyl, anthracyl, or phenanthryl, which may be unsubstituted or mono- or polysubstituted by $C_nF_{(2n+1-x)}H_x$, with $1<n<6$, and $0<x\leq13$, or halogen (F, Cl, Br), or representing an aromatic heterocyclic ring from the group of pyridyl, pyrazyl or pyrimidyl, which may be unsubstituted or mono- or polysubstituted by $C_nF_{(2n+1-x)}H_x$, with $1<n<6$, and $0<x\leq13$, or halogen (F, Cl, Br), or representing an alkyl residue ($C_1$–$C_8$) which may be partially or completely substituted by additional groups, preferably F, Cl, $N(C_nF_{(2n+1-x)}H_x)_2$, $O(C_nF_{(2n+1-x)}H_x)$, $SO_2(C_nF_{(2n+1-x)}H_x)$, $C_nF_{(2n+1-x)}H_x$, with $1<n<6$, and $0<x<13$, or wherein $OR^1$ to $OR^4$, each one alone or together, represent an aromatic or aliphatic carboxyl, dicarboxyl, oxysulfonyl, or oxycarboxyl residue which may be partially or completely substituted by additional groups, preferably F, Cl, $N(C_nF_{(2n+1-x)}H_x)_2$, $O(C_nF_{(2n+1-x)}H_x)$, $SO_2(C_nF_{(2n+1-x)}H_x)$, $C_nF_{(2n+1-x)}H_x$, with $1<n<6$, and $0<x\leq13$ (DE 100 26 565), may be included in the electrolyte.

Ionic liquids $K^+ A^-$ wherein $K^+$ is as defined above and A represents an anion selected from the group of $$[PF_x(C_yF_{2y+1-z}H_z)_{6-x}]^-$$

with $1 \leq x \leq 6$, $1 \leq y \leq 8$, and $0 \leq z \leq 2y+1$, may also be included (DE 100 27 995).

The mixtures according to the invention can be used in electrolytes for electrochemical cells including an anode material which consists of coated metal cores selected from the group of Sb, Bi, Cd, In, Pb, Ga, and tin, or alloys thereof (DE 100 16 024). The process for producing such anode material is characterized in that a) a suspension or sol of the core metal or alloy in urotropine is prepared, b) the suspension is emulsified with $C_5$–$C_{12}$ hydrocarbons, c) the emulsion is precipitated on the metal or alloy core, and d) the metal hydroxides or oxyhydroxides are converted to the corresponding oxides by tempering.

The mixtures according to the invention can also be used in electrolytes for electrochemical cells with cathodes made of common lithium intercalation and insertion compounds, but also with cathode materials consisting of lithium mixed oxide particles which are coated with one or more metal oxides (DE 199 22 522) by suspending the particles in an organic solvent, adding to the suspension a solution of a hydrolyzable metal compound and a hydrolyzing solution, and subsequently filtrating, drying and optionally calcining the coated particles. Said materials may also consist of lithium mixed oxide particles coated with one or more polymers (DE 199 46 066), obtained using a process wherein the particles are suspended in a solvent, and the coated particles subsequently are filtrated off, dried and optionally calcined. Likewise, the mixtures according to the invention can be used in systems including cathodes comprised of lithium mixed oxide particles having one or more coatings of alkali metal compounds and metal oxides (DE 100 14 884). The process for producing these materials is characterized in that the particles are suspended in an organic solvent, an alkali metal salt compound suspended in an organic solvent is added, metal oxides dissolved in an organic solvent are added, the suspension is added with a hydrolyzing solution, and the coated particles subsequently are filtrated off, dried and calcined. Likewise, the mixtures according to the invention can be used in systems including anode materials with doped tin oxide (DE 100 25 761). Such an anode material is prepared by a) adding urea to a tin chloride solution, b) adding the solution with urotropine and a suitable doping compound, c) emulsifying the sol thus obtained in petroleum ether, d) washing the resulting gel, and removing the solvent by suction, and e) drying and tempering the gel.

Likewise, the mixtures according to the invention can be used in systems including anode materials with reduced tin oxide (DE 100 25 762). This anode material is produced by a) adding urea to a tin chloride solution, b) adding the solution with urotropine, c) emulsifying the sol thus obtained in petroleum ether, d) washing the resulting gel, and removing the solvent by suction, e) drying and tempering the gel, and f) exposing the resulting $SnO_2$ to a stream of reducing gas in a gas-feedable oven.

The mixtures of the invention are advantageous because they do not show any sign of hydrolytic decomposition over a very broad temperature range. In addition to high thermal and electrochemical stability, they have high ionic conductivity.

By virtue of these properties, batteries, capacitors, supercapacitors, and galvanic cells including the salts or mixtures according to the invention can also be used under extreme conditions, such as high temperatures, with no adverse effects on their service life and performance by such conditions.

Furthermore, these batteries, capacitors, supercapacitors, and galvanic cells are remarkable for their highly constant voltage, unrestricted functionality over many charge/discharge cycles, as well as lower production cost.

The use of the mixtures of the invention in large batteries, such as those used in electric road vehicles or hybrid road vehicles is also highly advantageous, because no toxic and strongly etching hydrogen fluoride will be formed upon damage of the batteries, e.g. in case of an accident, not even upon contact with water, e.g. humidity or fire-fighting water.

With reference to the examples, the invention will be illustrated below. These explanations are merely by way of example and do not limit the general idea of the invention.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and, all parts and percentages are by weight, unless otherwise indicated.

The entire disclosure[s] of all applications, patents, and publications, cited above [or below], and of corresponding German Application No. 10055812.7, filed Nov. 10, 2000, and German Application No. 10058264.8, filed Nov. 23, 2000 is hereby incorporated by reference.

EXAMPLES

Example 1

Synthesis of a $Li[PF_3(C_2F_5)_3]$-polymer electrolyte $1^{st}$ step

Synthesis of tris(pentafluoroethyl)difluorophosphorane

To synthesize tris(pentafluoroethyl)difluorophosphorane, a cylindrical double-walled stainless steel vessel having a total volume of 1.5 liters was used as electrolytic cell. The electrolytic cell was provided with a nickel cathode and a nickel anode, each having an effective cathode and anode surface area of 3.75 $dm^2$, and with a reflux condenser cooled to a temperature of −20° C. The temperature of the electrolytic cell was 0° C.

Initially, 1125 g of liquid hydrogen fluoride was pre-electrolyzed for 100 hours in the electrolytic cell. Subsequently, a total of 69 g of triethylphospine was added in portions.

The electrolysis voltage was 4.4 to 5.4 V, the current density was 0.30 to 0.53 $A/dm^2$, with an overall conversion of 2918.4 Ah (corresponding to 146.5% in theory). The liquid electrolysis products are insoluble in hydrogen fluoride and were removed from the hydrogen fluoride by phase separation. The crude product thus obtained then was purified by fractionated distillation under reduced pressure and isolated.

$2^{nd}$ step

Synthesis of lithium tris(pentafluoroethyl)trifluorophosphate

A suspension consisting of 0.86 to 1.56 g (0.033 to 0.06 mol) of lithium fluoride in 30 ml of a mixture of ethylene carbonate and dimethyl carbonate at a ratio of 1:1 (volume/volume) was placed in a Teflon vessel. With exclusion of moisture, 12.78 g (0.03 mol) of tris(pentafluoroethyl) difluorophosphorane prepared according to step 1 was added to the suspension at a temperature of from 0 to 25° C. (when starting the reaction, cooling to 0° C. was effected, and then the temperature was allowed to rise gradually to about 20 to 25° C.). The solution thus obtained then was stirred until the phase boundary initially present disappeared, and excess lithium fluoride was filtrated off.

$3^{rd}$ step

Preparation of the $Li[PF_3(C_2F_5)_3]$-polymer electrolyte 20 g of the solution obtained according to step 2 was added with 1 g (5 wt.-%) of a crosslinked polyvinylidene difluoride copolymer (Kynarflex®, Atofina Chemicals, Inc.).

Subsequently, the suspension was heated at a temperature of from 50 to 60° C. until the copolymer had completely dissolved, and then cooled to room temperature.

The consistency of the polymer electrolyte can be controlled via the amount of copolymer. Up to a concentration of about 3 wt.-% of copolymer, a highly viscous liquid electrolyte is obtained. At a concentration of from about 3 to about 10 wt.-% of copolymer, a gel-like electrolyte is obtained, and from a concentration of about 10 wt.-% on, a solid polymer electrolyte is obtained.

Example 2

Synthesis of a $Li[PF_3(n-C_4F_9)_3]$-polymer electrolyte

The synthesis of tris(nonafluoro-n-butyl)difluorophosphorane was performed according to Example 1 ($1^{st}$ step) using tri-n-butylphosphine. Lithium tris (nonafluoro-n-butyl)trifluorophosphate was prepared according to the $2^{nd}$ step of Example 1.

The $Li[PF_3(n-C_4F_9)_3]$-polymer electrolyte was produced according to the $3^{rd}$ step of Example 1.

Example 3

Tests relating to the thermal stability of the electrolytes

The thermal stability was tested using DSC (differential scanning calometry). Each one of the electrolytes was heated in an apparatus from TA Instruments designated Universal V 2.4 F. The heating rate was 4° C. per minute.

The $Li[PF_3(C_2F_5)_3]$-polymer electrolyte prepared according to Example 1 had a decomposition temperature of >200° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A mixture comprising:
    a) at least one fluoroalkylphosphate salt of general formula (I)

$$M^{n+}([PF_x(C_yF_{2y+1-z}H_z)_{6-x}]^-)_n \quad (I)$$

wherein
    $M^{n+}$ is a univalent, bivalent or trivalent cation,
    $1 \leq x \leq 5$,
    $1 \leq y \leq 8$, and
    $0 \leq z \leq 2y+1$, n=1, 2 or 3, and the ligands $(C_yF_{2y+1-z}H_z)$ each are the same or different, and
    b) at least one polymer.

2. The mixture according to claim 1, wherein $M^{n+}$ is a lithium cation, a sodium cation, a potassium cation, a rubidium cation, a cesium cation, a magnesium cation, or an aluminum cation.

3. The mixture according to claim 1, wherein $M^{n+}$ represents an organic cation.

4. The mixture according to claim 3, wherein $1 \leq o \leq 6$, $0 \leq p \leq 2o+1$, $0 \leq q \leq 2o+1$, and A represents an aromatic residue optionally having heteroatoms, or a 5- or 6-membered cycloalkyl residue.

5. The mixture according to claim 3, wherein A is a 5- or 6-membered aromatic or cycloaliphatic residue optionally including nitrogen and/or sulfur and/or oxygen atoms, or a substituted phenyl or pyridine residue.

6. The mixture according to claim 1, wherein $1 \leq x \leq 5$, $1y \leq 8$, and z=0.

7. The mixture according to claim 1, wherein at least one fluoroalkylphosphate salt of:

$Li^+[F_{6-x}P(CF_2CF_3)_x]^-$, with $1 \leq x \leq 3$,
$Li^+[F_{6-x}P(CF_2CF_2CF_3)_x]^-$, with $1 \leq x \leq 3$,
$Li^+[F_{6-x}P(CF_2CF_2CF_2CF_3)_x]^-$, with $1 \leq x \leq 3$,
$Li^+[F_{6-x}P)CF(CF_3)_2)_x]^-$, with x=1 or 2,
$[N(C_2H_5)_4][PF_3(C_2F_5)_3]$,
$[N(CH_3)_4][PF_3(C_4F_9)_3]$,
$[P(N(CH_3)_2)_4][PF_3(C_2F_5)_3]$,
$[P(N(CH_3)_2)_4][PF_3(C_4F_9)_3]$,
$[P(CH_3)_4][PF_3(C_2F_5)_3]$,
$[P(C_2H_5)_4][PF_3(C_2F_5)_3]$,
$[P(CH_3)_4][PF_3(C_4F_9)_3]$,
$[P(C_2H_5)_4][PF_3(C_4F_9)_3]$,
$[C(N(CH_3)_2)_3][PF_3(C_2F_5)_3]$, or
$[C(N(CH_3)_2)_3][PF_3(C_4F_9)_3]$ is present as component a).

8. The mixture according to claim 1, wherein component b) is a homopolymer or copolymer of an unsaturated nitrile, a vinylidene, an acrylate, a methacrylate, a cyclic ether, an alkylene oxide, a siloxane, a phosphazene, an alkoxysilane, or an organically modified ceramic, or a mixture of at least two of the above-mentioned homopolymers and/or copolymers and optionally at least one organically modified ceramic.

9. The mixture according to claim 8, wherein component b) is a homopolymer or copolymer of vinylidene difluoride, acrylonitrile, methyl (meth)acrylate or tetrahydrofuran.

10. The mixture according to claim 1, wherein the polymer is at least partially crosslinked.

11. The mixture according to claim 1, wherein the mixture includes from 5 to 99 wt.-% of component a) and from 95 to 1 wt.-% of component b) each time relative to the sum of components a) and b).

12. The mixture according to claim 1, wherein the mixture additionally includes at least one solvent.

13. The mixture according to claim 12, wherein the mixture includes as solvent an organic carbonate, an organic ester, an organic ether, an organic amide, a sulfur-containing solvent, an aprotic solvent, or at least a partially fluorinated derivative of the above-mentioned solvent or a mixture of at least two of these solvents and/or fluorinated derivatives of these solvents.

14. A method of producing a mixture according to claim 1, wherein at least one fluoroalkylphosphate salt of general formula (1) and at least one polymer and optionally at least one solvent are mixed.

15. The method according to claim 14, wherein said mixing is effected at elevated temperature.

16. An electrolyte, a primary battery, a secondary battery, a capacitor, a supercapacitor, or a galvanic cell comprising a mixture according to claim 1.

17. An electrolyte comprising at least one mixture according to claim 1.

18. A primary battery comprising at least one mixture according to claim 1.

19. A secondary battery comprising at least one mixture according to claim 1.

20. A capacitor comprising at least one mixture according to claim 1.

21. A supercapacitor comprising at least one mixture according to claim 1.

22. A galvanic cell comprising at least one mixture according to claim 1.

23. The mixture according to claim 2, wherein $M^{n+}$ is a lithium cation.

24. The mixture according to claim 3, wherein the organic cation is a nitrosyl cation, a nitryl cation, or a cation of general formula $[NR_4]^+$, $[P(NR_2)_kR_{4-k}]^+$, with $0 \leq k \leq 4$, $[C(NR_2)_3]^+$, or $[CR_3]^+$, wherein each of the residues R, same or different, represents H,
$C_oF_{2o+1-p-q}H_pA_q$, or
A,
wherein
$1 \leq o \leq 10$, $0 \leq p \leq 2o+1$, and $0 \leq q \leq 2o+1$, and A represents an aromatic residue optionally having heteroatoms.

25. The mixture according to claim 3, wherein the organic cation is a 5- or 6-membered cycloalkyl residue.

26. The mixture according to claim 8, wherein component b) is a homopolymer or copolymer of an acrylonitrile, a vinylidene difluoride, a methylacrylate, a methylmethacrylate, a tetrahydrofuran, or an ethylene oxide.

27. The mixture according to claim 8, wherein component b) is a homopolymer or copolymer of vinylidene difluoride.

28. The mixture according to claim 1, wherein the mixture comprises from 60–99 wt.-% of component a) and from 40 to 1 wt.-% of component b).

29. The mixture according to claim 12, wherein the mixture comprises, as a solvent:

ethylene carbonate, propylene carbonate, butylene carbonate, dimethyl carbonate, diethyl carbonate, ethyl methyl carbonate, methyl propyl carbonate, methyl formate, ethyl formate, methyl acetate, ethyl acetate, methyl propionate, ethyl propionate, methyl butyrate, ethyl butyrate, γ-butyrolactone, diethyl ether, dimethoxyethane, diethoxyethane, dimethylformamide, dimethylacetamide, dimethylsulfoxide, dimethyl sulfite, diethyl sulfite, propanesultone, acetonitrile, acrylonitrile, or acetone.

30. The method according to claim 15, wherein the elevated temperature is 20–90° C.

31. The method according to claim 15, wherein the elevated temperature is 40–60° C.

32. A mixture according to claim 1, wherein the mixture has a decomposition temperature greater than 200° C.

33. An electrolyte according to claim 17, wherein the electrolyte is a $Li[PF_3(C_2H_5)_3]$-polymer electrolyte having a decomposition temperature greater than 200° C.

* * * * *

UNITED STATES PATENT AND TRADEMARK OFFICE
CERTIFICATE OF CORRECTION

PATENT NO. : 6,794,083 B2
DATED : September 21, 2004
INVENTOR(S) : Michael Schmidt et al.

It is certified that error appears in the above-identified patent and that said Letters Patent is hereby corrected as shown below:

Column 12,
Line 59, "$1\leqq x\leqq 5$" should read -- $1\leq x\leq 5$ --.
Line 60, "$1\leqq y\leqq 8$" should read -- $1\leq y\leq 8$ --.
Line 61, "$0\leqq z\leqq 2y+1$" should read -- $0\leq z\leq 2y+1$ --.

Column 13,
Line 3, "$1\leqq o\leqq 6$" should read -- $1\leq o\leq 6$ --.
Line 4, "$0\leqq p\leqq 2o+1, 0\leqq q\leqq 2o+1$" should read -- $0\leq p\leq 2o+1, 0\leq q\leq 2o+1$ --.
Line 11, "$1\leqq x\leqq 5$" should read -- $1\leq x\leq 5$ --.
Line 12, "$1y\leqq 8$" should read -- $1y\leq 8$ --.
Lines 15, 16 and 17, "$1\leqq x\leqq 3$" should read -- $1\leq x\leq 3$ --.
Line 18, "$Li^+[F_{6-x}P)CF(CF_3)_2)_x]^-$, with x = 1 or 2" should read
-- $Li^+[F_{6-x}P(CF(CF_3)_2)_x]^-$, with x = 1 or 2 --.

Column 14,
Line 27, "$1\leqq o\leqq 10, 0\leqq p\leqq 2o+1$, and $0\leqq q\leqq 2o+1$" should read
-- $1\leq o\leq 10, 0\leq p\leq 2o+1$, and $0\leq q\leq 2o+1$ --.

Signed and Sealed this

Twenty-sixth Day of July, 2005

JON W. DUDAS
*Director of the United States Patent and Trademark Office*